(12) United States Patent
Kuhmann et al.

(10) Patent No.: US 10,974,866 B2
(45) Date of Patent: Apr. 13, 2021

(54) PALLET HAVING PANELS AND TUBE SEGMENTS

(71) Applicant: AIR BAMBOO INDUSTRIAL GMBH, Eberswalde (DE)

(72) Inventors: Jochen Kuhmann, Berlin (DE); Matthias Albrecht, Berlin (DE); Roman Kujus-Tenekedshijew, Federow (DE)

(73) Assignee: AIR BAMBOO INDUSTRIAL GMBH, Eberswalde (DE)

( * ) Notice: Subject to any disclaimer, the term of this patent is extended or adjusted under 35 U.S.C. 154(b) by 0 days.

(21) Appl. No.: 16/321,153

(22) PCT Filed: Jul. 26, 2017

(86) PCT No.: PCT/EP2017/068926
§ 371 (c)(1),
(2) Date: Jan. 28, 2019

(87) PCT Pub. No.: WO2018/019906
PCT Pub. Date: Feb. 1, 2018

(65) Prior Publication Data
US 2019/0177037 A1    Jun. 13, 2019

(30) Foreign Application Priority Data

Jul. 29, 2016  (DE) ..................... 10 2016 114 139.9
Jan. 25, 2017  (EP) ..................... 17153146

(51) Int. Cl.
*B65D 19/00*    (2006.01)
*B31D 3/02*    (2006.01)
(Continued)

(52) U.S. Cl.
CPC ....... *B65D 19/0073* (2013.01); *B31D 1/0075* (2013.01); *B31D 3/0207* (2013.01);
(Continued)

(58) Field of Classification Search
CPC .......... B65D 19/0073; B65D 19/0075; B65D 19/0053; B65D 19/0057; B31D 1/0075; B32B 3/12; B32B 3/20
See application file for complete search history.

(56) References Cited

U.S. PATENT DOCUMENTS 2,477,852 A * 8/1949 Bacon ...................... E04C 2/36
                                                  428/116
2,544,657 A * 3/1951 Cushman .......... B65D 19/0028
                                                  108/53.3
(Continued)

FOREIGN PATENT DOCUMENTS

CA    3031843 A1 *  2/2018 .............. B32B 3/20
CN    2818356         9/2006
(Continued)

*Primary Examiner* — Daniel J Rohrhoff
(74) *Attorney, Agent, or Firm* — JMB Davis Ben-David

(57) ABSTRACT

The invention relates to a pallet (1), comprising a basic body (10) with a first panel (11), a second panel (12) and a layer (13) having a plurality of tube segments (14) which is arranged between the panels (11, 12), wherein the layer (13) has at least one cutout (131) which is continuous in the direction of a pallet height (HP), and wherein the first panel (11) has at least one first opening (111) which at least partially overlaps with the at least one cutout (131). The invention further relates to a foot (16) and a runner (17) for a pallet (1), to a sandwich block (2) for producing a layer (13) of a pallet (1), and to a method for producing a pallet (1).

23 Claims, 8 Drawing Sheets

(51) Int. Cl.
  *B32B 3/18* (2006.01)
  *B31D 1/00* (2017.01)
  *B32B 3/20* (2006.01)
  *B32B 21/13* (2006.01)
(52) U.S. Cl.
  CPC ......... B31D 3/0223 (2013.01); B31D 3/0284 (2013.01); B32B 3/18 (2013.01); B32B 3/20 (2013.01); B32B 21/13 (2013.01); B65D 19/0075 (2013.01); B65D 2519/00029 (2013.01); B65D 2519/00064 (2013.01); B65D 2519/0094 (2013.01); B65D 2519/00099 (2013.01); B65D 2519/00273 (2013.01); B65D 2519/00293 (2013.01); B65D 2519/00303 (2013.01); B65D 2519/00323 (2013.01); B65D 2519/00333 (2013.01); B65D 2519/00338 (2013.01); B65D 2519/00955 (2013.01)

(56) References Cited

U.S. PATENT DOCUMENTS

| | | | | |
|---|---|---|---|---|
| 3,200,489 A | * | 8/1965 | Keeleric | ................. B31D 3/02 228/118 |
| 4,428,993 A | * | 1/1984 | Kohn | ....................... B32B 3/12 428/117 |
| 2006/0130712 A1 | * | 6/2006 | Wang | ................ B65D 19/0075 108/57.25 |
| 2010/0199889 A1 | | 8/2010 | Cramer | |
| 2012/0021168 A1 | * | 1/2012 | Tanii | ......................... B32B 3/12 428/116 |
| 2014/0302276 A1 | * | 10/2014 | Kusu | ...................... B32B 27/12 428/113 |
| 2015/0174881 A1 | * | 6/2015 | Stoll | ................. B29D 99/0089 428/116 |
| 2016/0023437 A1 | * | 1/2016 | Duong | ................... B32B 27/08 428/201 |
| 2018/0311927 A1 | * | 11/2018 | Tyan | ........................ B32B 3/12 |

FOREIGN PATENT DOCUMENTS

| | | |
|---|---|---|
| DE | 19845991 | 4/2000 |
| FR | 2087654 | 12/1971 |
| JP | 2003040268 | 2/2003 |
| JP | 2005188252 | 7/2005 |
| JP | 2007045516 | 2/2007 |
| WO | 2010109253 | 9/2010 |
| WO | 2017021344 | 2/2017 |

* cited by examiner

A

B

A

B

US 10,974,866 B2

PALLET HAVING PANELS AND TUBE SEGMENTS

CROSS-REFERENCE TO RELATED APPLICATIONS

This is the U.S. National Stage of International Application No. PCT/EP2017/068926 filed on Jul. 26, 2017, which was published in German under PCT Article 21(2), which in turn claims priority to German Patent Application No. 102016114139.9 filed Jul. 29, 2016 and European Patent Application No. 17153146.0 filed on Jan. 25, 2017.

The invention relates to a pallet, in particular for the transport of goods.

Transport pallets according to EN 13698-1 and UIC 435-2 (Europool pallets) are known from the prior art. These comprise three floor boards, each connected by three blocks to three transverse boards on which five cover boards are arranged. The corresponding boards are formed of solid wood.

A disadvantage of solid wood pallets is their relatively high weight (20 to 24 kg, depending on wood moisture content, with dimensions of 1200×800×144 mm).

This results in the objective of providing a pallet which, compared to the state of the art, has a reduced weight with the same stability.

This objective is attained by the pallet of the present invention according to claim 1, the foot of the present invention according to claim 15, the runner of the present invention according to claim 17, the sandwich block of the present invention according to claim 18 and the method of the present invention according to claim 23. Specific embodiments of the pallet are specified in dependent claims 2 to 14, a specific embodiment of the foot is specified in dependent claim 16, specific embodiments of the sandwich block are specified in claims 19 to 22 and specific embodiments of the method are specified in claims 24 and 25. The embodiments are described hereafter.

A first aspect of the invention relates to a pallet, comprising a basic body that comprises at least the following components:

a first panel and a second panel arranged parallel to the first panel, the first panel and the second panel each extending in the direction of a pallet width and a pallet depth, the pallet comprising a pallet height perpendicular to the pallet width and the pallet depth, a layer arranged between the first panel and the second panel, the layer comprising a plurality of tube segments, the tube segments each comprising two cut ends which delimit the tube segments in the circumferential direction, the tube segments each comprising a segment depth, a segment width and a segment height, wherein the segment depth corresponds to the maximum extension of the tube segment in the longitudinal extension direction, and wherein the segment width corresponds to the maximum extension of the tube segment along an (imaginary) connecting line between the cut ends perpendicularly to the longitudinal extension direction (that is in the cross-sectional direction of the tube segment), and wherein the segment height corresponds to the maximum extension perpendicular to the segment depth and the segment width, and wherein the tube segments are arranged in the layer such that the segment depth runs in the direction of the pallet height, the segment width runs in the direction of the pallet width and the segment height runs in the direction of the pallet depth, wherein the layer comprises at least one cutout which is continuous in the direction of the pallet height, and wherein the first panel comprises at least one first opening which at least partially overlaps with the at least one cutout.

This means in particular that the at least one first opening has the same dimensions as the at least one cutout, wherein the at least one first opening is coincident with the at least one cutout, or that the at least one first opening is smaller than the at least one cutout, part of the at least one cutout being coincident with the at least one first opening.

A first sub-aspect of the first aspect of the invention relates to a pallet comprising a basic body which comprises at least the following components:

a first panel and a second panel arranged parallel to the first panel, the first panel and the second panel each extending in the direction of a pallet width and a pallet depth, the pallet comprising a pallet height perpendicular to the pallet width and the pallet depth, a layer arranged between the first panel and the second panel, the layer comprising a plurality of tube segments, the tube segments each comprising two cut ends which delimit the tube segments in the circumferential direction, and wherein each of the tube segments comprises a segment depth, a segment width and a segment height, wherein the segment depth corresponds to the maximum extension of the tube segment in the longitudinal extension direction, and wherein the segment width corresponds to the maximum extension of the tube segment along an (imaginary) connecting line between the cut ends perpendicularly to the direction of longitudinal extension (that is in the cross-sectional direction of the tube segment), and wherein the segment height corresponds to the maximum extension perpendicular to the segment depth and the segment width, and wherein the tube segments are arranged in the layer such that the segment depth runs in the direction of the pallet height, the segment width runs in the direction of the pallet width and the segment height runs in the direction of the pallet depth, wherein the layer comprises at least one cutout which is continuous in the direction of the pallet height, wherein the at least one cutout comprises an extension in the direction of the pallet width which corresponds at least to the segment width and an extension in the direction of the pallet depth which corresponds at least to the segment height, and wherein the first panel comprises at least one first opening which at least partially overlaps with the at least one cutout.

A second sub-aspect of the first aspect of the invention relates to a pallet comprising a basic body comprising at least the following components:

a first panel and a second panel arranged parallel to the first panel, the first panel and the second panel each extending in the direction of a pallet width and a pallet depth, the pallet comprising a pallet height perpendicular to the pallet width and the pallet depth, a layer arranged between the first panel and the second panel, the layer comprising a plurality of tube segments, the tube segments each comprising two cut ends which delimit the tube segments in the circumferential direction, wherein each of the tube segments comprises a segment depth, a segment width and a segment height, wherein the segment depth corresponds to the maximum extension of the tube segment in the longitudinal extension direction, and wherein the segment width corresponds to the maximum extension of the tube segment along an (imaginary) connecting line between the cut ends perpendicularly to the direction of longitudinal extension (that is in the cross-sectional direction of the tube segment), and wherein the segment height corresponds to the maximum extension perpendicular to the segment depth and the segment width, and wherein the tube segments are arranged in the layer such that the segment depth runs in the direction of the pallet height, the segment width runs in the direction of the pallet width and the segment height runs in the direction of the pallet depth, wherein the layer comprises at least one cutout which is continuous in the direction of the pallet height, the at least one cutout comprising an extension in the direction of the pallet width which is less than the segment width and an extension in the direction of the pallet depth which is less than the segment height, and wherein the first panel comprises at least one first opening which at least partially overlaps with the at least one cutout.

The pallet according to the invention is characterized by a very low weight and high mechanical stability, in particular due to the wood composite used and the cavities in the layer. Furthermore, additional components, e.g. the feet of a pallet, can be advantageously inserted into the cutouts.

In the context of this invention, the term tube segment refers to a part of a real or imaginary tube with a longitudinal direction of extension. The cross-section of the tube perpendicular to its longitudinal extension direction comprises a circumference, i.e. an imaginary line, which delimits the cross-section on its outside. The cross-section is not necessarily circular, but can also be angular or elliptical. The circumferential direction of the tube runs (also in the case of a tube with an angular cross-section) along an imaginary circle, which defines the cross section of the tube perpendicularly to the longitudinal direction of extension.

The tube segments each comprise a wall which is delimited in the circumferential direction by the cut ends, wherein the wall is open in the circumferential direction. Therein, the wall is continuously open in longitudinal extension direction. The circumferential direction of the tube segment means the circumferential direction of the associated real or imaginary tube which has a closed wall. The tube segment can be particularly formed by cutting of a tube, but can also be formed in other ways, in particular by mechanically connecting several strips or by an extruder process.

The cut ends of the tube segment delimit the tube segment in the circumferential direction. The wall of the tube segment is thus delimited in the circumferential direction by the cut ends. The cross-section of the tube segment is thus formed by an open profile. In particular, the open profile can be circular segment shaped, e.g. semicircular, U-shaped or V-shaped.

The tube segments further comprise two cut surfaces, which delimit the tube segments in the longitudinal extension direction. In particular, the cut surfaces run perpendicular to the longitudinal extension direction.

According to an embodiment, the tube segments are each connected to the first panel by one of the cut surfaces and/or mechanically connected to the second panel by the respective other cut surface.

According to a further embodiment, the tube segments are perpendicular to the first panel and the second panel with regard to their longitudinal extension direction.

In particular, the connecting line between the cut ends runs along the common direction of the cut ends, in particular in cross section with respect to the longitudinal extension direction of the tube segment. In cases where the cut ends are not parallel to each other in cross-section, the connecting line is defined between the points of the cut surfaces with the largest extension in circumferential direction.

The tube segments each form a cavity which is delimited by the inner surface of the wall. Therein, the segment width (i.e. the outer width of the tube segment) corresponds to the sum of the maximum extension of the cavity in the direction of the connecting line between the cut ends perpendicular to the longitudinal extension direction (i.e. in cross-section) and twice the wall thickness. The segment height corresponds to the sum of the maximum extension of the cavity perpendicular to the segment width and the wall thickness.

In the context of this invention, the term 'cutout' can therefore refer either to the said cavity formed by the interior of the tube segments or to a gap between two adjacent tube segments of the layer. The extension of the cavity inside the tube segments is, as described above, twice as much as the wall thickness smaller than the segment width and smaller by one wall thickness than the segment height and is therefore a cutout in the sense of the invention.

The at least one cutout comprises an extension in the direction of the pallet width and an extension in the direction of the pallet depth. In the event that the at least one cutout has a shape in which the extension in the direction of the pallet width or the pallet depth is not constant, the term 'extension of the cutout' refers to the minimum extension in the respective direction in the context of the present invention.

According to an embodiment of the pallet, the at least one cutout comprises an extension at least equal to the segment width in the direction of the pallet width, and the at least one cutout comprises an extension at least equal to the segment height in the direction of the pallet depth.

In this case, the corresponding cavities inside the tube segments are smaller in both directions (in the direction of the pallet width and in the direction of the pallet depth) than the cutout. Herein, a cutout is formed in particular by omitting tube segments at certain positions of the layer.

According to a further embodiment, the at least one cutout comprises an extension which is smaller than the segment width in the direction of the pallet width, and the at least one cutout comprises an extension that is less than the segment height in the direction of the pallet depth.

In this case, the cavities inside the tube segments in particular also form cutouts in the sense of the invention, into which e.g. a foot of the pallet can be inserted.

According to a further embodiment, the at least one cutout comprises an extension which corresponds to at least twice the segment width in the direction of the pallet width.

According to a further embodiment, the at least one cutout comprises an extension which corresponds to at least twice the segment height in the direction of the pallet depth.

According to a further embodiment, the extension of the cutout in the direction of the pallet width is at least 50 mm, wherein the extension in the direction of the pallet depth is at least 30 mm.

The cutout is therefore sufficiently large for the insertion of a foot.

The at least one first opening of the first panel comprises an extension in the direction of the pallet width and an extension in the direction of the pallet depth. According to an embodiment, the at least one first opening has a rectangular shape. In the event that the at least one first opening has a shape in which the extension in the direction of the pallet width or the pallet depth is not constant, the minimum extension in the respective direction is meant with the term 'extension of the first opening' in the context of the present invention.

According to an embodiment, the pallet comprises a wood composite or is formed of a wood composite. According to an embodiment, the tube segments comprise a wood composite or are formed of a wood composite. According to a further embodiment, the first panel and/or the second panel comprises a wood composite. According to a further embodiment, the first panel and/or the second panel is formed of a wood composite.

In the context of the present invention, the term wood composite refers to a material which comprises comminuted wood, in particular wood chips, wood veneers, wood veneer strips, wood wool, wood fibres or wood dusts, or other lignocellulosic materials. Furthermore, the wood composite may in particular contain binders, adhesives and/or additives. Additives can in particular be hydrophobizing agents, wood preservatives, flame retardants, hardeners or paint particles. Binders include in particular urea glue, synthetic resins, e.g. phenolic resins, isocyanates, plastics and/or bioplastics. Wood veneers and/or wood veneer strips are used in particular for the production of plywood and/or coarse particle boards (OSB boards).

Wood composites include in particular solid wood composite, e.g. solid wood panels (in accordance with DIN EN 12775) or laminated wood panels, cross laminated timber, glued laminated timber, plywood and/or laminated timber, veneer wood composites, e.g. veneer plywood (FU), veneer laminated timber, veneer strip wood, bending plywood, wood chip materials, e.g. flat pressed boards (P2), extruded boards, chipboard mouldings, coarse chipboard (OSB boards, according to DIN EN 300) and/or chipboard strip (LSL), wood fibre materials, e.g. wood fibre insulation boards (HFD), porous fibre boards, soft boards (SB), medium hard fibreboards (MB), hard fibreboards (HB or HFH), hard fibreboards, extra hard fibreboards (HFE), medium density fibreboards (MDF), high density fibreboards (HDF) and/or ultra light fibreboards (ULDF), arboform or liquid wood.

The term fibreboard refers to the wood composites specified in DIN EN 622. The term chipboard refers to the wood composites specified in the standards DIN EN 309 and DIN EN 312. The term plywood refers to the wood composites specified in the standards DIN 68708 and DIN EN 313.

As a basic material for shell construction and interior construction, wood composites have the advantage of high material strength and mechanical load-bearing capacity while being lightweight at the same time.

According to an embodiment, the wood composite has a lignin content of >5%, in particular >10% by weight. This means that in particular paper and cardboard do not represent wood composites in the sense of the present invention, since the lignin of the wood raw materials used is largely removed during paper production, e.g. by chemical bleaching agents.

According to a further embodiment, the wood composite is free of chemical bleaching agents.

According to a further embodiment, the wood composite is produced in a drying process at a wood moisture of <20%. Therein, the percentage refers to the ratio of the water weight to the absolutely dry wood mass. In a drying process, the wood particles are dried before fleece formation and pressing to yield the product and the product comprises a wood moisture of under 20%. Glue can be applied before or after drying.

According to a further embodiment, the wood composite comprises wood fibres pressed under pressure and/or heat. According to a further embodiment, the wood composite comprises a density of >800 kg/m³. High-density fibreboards, for example, have a density in this range.

According to a further embodiment, the tube segments are formed of a material of a high density fibreboard (HDF). High density fibreboard (HDF) has a particularly high strength.

According to a further embodiment, the tube segments are formed from a plurality of strips. The strips run in the longitudinal extension direction of the tube segment. In this embodiment, in particular a tube segment with an angular cross-section is formed.

According to an embodiment, the strips comprise a wood composite or are formed of a wood composite.

According to an embodiment, the tube segments are formed of pressed wood, in particular pressed wood fibres or wood chips. For example, the tube segments can be produced by cutting tubes from pressed wood. The production of such a tube can, for example, be carried out by pressing a wood mass comprising shredded wood, in particular wood fibres or wood shavings, into a press forming channel with a tubular cutout and hardening of the wood mass. Alternatively, a half tube or tube segment can also be produced directly by pressing a wood mass, in particular in a press forming channel with a tube segment shaped cutout or by a flat pressing tool with a suitable contour.

According to a further embodiment, the wood composite is produced from a wood mass, in particular a dendro mass, by means of an extruder process.

The use of pressed wood allows the cost-effective production of tubes or tube segments of almost any shape and dimension, whereby a very uniform dimensioning of the tubes or tube segments can be achieved in comparison to natural products.

According to a further embodiment, the tube segments comprise an angular cross-section, in particular an octagon segment shaped cross-section.

Tube segments with an octagon segment cross-section achieve a particularly advantageous distribution of forces when exerting forces on the basic body of the pallet according to the invention, which results in increased mechanical stability of the pallet.

According to a further embodiment, the tube segments comprise a U-shaped cross-section. According to a further embodiment, the tube segments comprise a trapezoidal cross-section.

A trapezoidal cross section has the advantage of being particularly easy to manufacture and at the same time has good stability properties.

According to a further embodiment, the tube segments are formed of a plate, in particular an HDF plate, which is folded into a U-shape or a trapezoidal segment shape.

Therein, the tube segments are formed in particular by milling out V-shaped mitres in the plate, folding the plate at the mitres and gluing at the mitres.

According to a further embodiment, all tube segments of the layer essentially comprise a uniform segment depth.

According to a further embodiment, all tube segments of the layer essentially comprise a uniform segment width.

According to a further embodiment, all tube segments of the layer essentially comprise a uniform segment height.

According to a further embodiment, the at least one cutout is completely surrounded by tube segments in the direction of the pallet width and pallet depth.

According to a further embodiment, the layer comprises at least one row of tube segments extending in the direction of the pallet width, wherein particularly adjacent tube segments within the at least one row are mechanically connected.

The mechanical stability of the pallet is advantageously increased by a mechanical connection of adjacent tube segments.

According to a further embodiment, the layer comprises at least one first row of tube segments extending in the direction of the pallet width and at least one second row of tube segments extending in the direction of the pallet width.

According to a further embodiment, the layer comprises at least one first row of tube segments extending in the direction of the pallet width, at least one second row of tube segments extending in the direction of the pallet width and at least one strip, wherein the tube segments of the at least one first row and the tube segments of the at least one second row are mechanically connected via the at least one strip, wherein particularly the tube segments of the at least one first row are mechanically connected to a first strip side of the at least one strip by means of their cut ends, and the tube segments of the at least one second row are mechanically connected by means of their cut ends to a second strip side of the at least one strip opposite the first strip side.

Such strips mechanically connect and stabilize the tube segments of two rows, thus increasing the mechanical stability of the basic body of the pallet.

According to a further embodiment, the second panel comprises at least one second opening which at least partially overlaps with the at least one cutout.

This means in particular that the at least one second opening comprises the same dimensions as the at least one cutout, the at least one second opening being coincident with the at least one cutout, or that the at least one second opening is smaller than the at least one cutout, part of the at least one cutout being coincident with the at least one second opening.

According to a further embodiment, the second panel has at least one second opening which at least partially overlaps with the at least one cutout, wherein the at least one second opening comprises a smaller extension in the direction of the pallet depth or in the direction of the pallet width, in particular in the direction of the pallet depth, than the at least one first cutout with which the at least one second opening overlaps.

The at least one second opening of the second panel each comprises an extension in the direction of the pallet width and an extension in the direction of the pallet depth. According to an embodiment, the at least one second opening has a rectangular shape. In the event that the at least one second opening has a shape in which the extension in the direction of the pallet width or the pallet depth is not constant, the term 'extension of the second opening' refers to the minimum extension in the respective direction in connection with the present invention.

According to a further embodiment, the at least one second opening comprises a smaller extension in the direction of the pallet depth than the corresponding at least one cutout with which the at least one second opening overlaps.

According to a further embodiment, the at least one second opening comprises a smaller extension in the direction of the pallet width than the corresponding at least one cutout with which the at least one second opening overlaps.

Such an at least one second opening is located on the opposite side of the pallet to the feet or runners (i.e. the upper side). By means of such openings, in particular, it is possible to advantageously stack several pallets in a stable and space-saving manner by inserting the feet of another pallet according to the invention into the second openings.

The smaller extension of the second opening in the direction of the pallet depth or pallet width creates at least one additional space between the second panel and the adjoining tube segments of the layer of the pallet. This has the advantage that an additional component of the pallet, e.g. a foot or a block of a runner, can be placed, in particular wedged, in the said additional space. In particular, this allows a particularly simple mechanical connection between the additional component and the basic body of the pallet.

According to a further embodiment, the pallet further comprises at least one foot, particularly according to the second aspect of the invention, which is mechanically connected to the basic body.

According to a further embodiment, the at least one foot is formed of a wood composite.

Advantageously, it is possible to store a pallet according to the invention on such feet. In addition, the pallet according to the invention can be used as a four-way pallet and picked up in particular using a forklift truck assuming that respective distances between the feet are provided.

According to a further embodiment, the at least one foot is at least partially arranged in the at least one cutout, in particular to mechanically connect the foot to the basic body.

According to a further embodiment, the at least one foot comprises at least two supporting elements, in particular exactly two supporting elements, for mechanically connecting the at least one foot to the basic body and at least one joining element, in particular exactly one joining element, the at least two supporting elements being mechanically connected by means of the at least one joining element, in particular in each case on a first side.

The said mechanical connection of the foot to the basic body can take place, for example, by clamping or wedging the foot, in particular the supporting elements, in the respective cutout of the layer. As an option, the foot can additionally be glued with components of the basic body of the pallet.

According to a further embodiment, the at least two supporting elements and the at least one joining element are each formed of a board of a wood composite, e.g. of an HDF board. In particular, the at least two supporting elements and the at least one joining element are formed from a single board, the board comprising mitres on the connecting surfaces (in particular first sides) between the at least two supporting elements and the at least one joining element.

According to a further embodiment, the at least two supporting elements comprise a base area with a first side and a second side arranged parallel to the first side, wherein the at least two supporting elements are each mechanically connected via their first side to the at least one joining element, and wherein the length of the first side represents the minimum extension of the respective supporting element in the direction of the respective first side, and wherein the length of the second side represents the maximum extension of the respective supporting element in the direction of the respective second side.

Therein, in particular, the first side and the second side comprise different lengths. The base area, therein, is delimited in particular by the first side and the second side.

The supporting element thus becomes narrower from the second side to the first side. The joining element of the at least one foot forms the bearing surface on the ground when the at least one foot is connected to the basic body of the pallet and the pallet stands on the at least one foot. Such an arrangement has the advantage that pallets equipped with such feet are easily stackable, the feet of a first pallet being insertable into the second openings of the second panel of a second pallet when the first pallet is stacked on the second pallet.

According to the embodiment of the foot, the at least two supporting elements comprise a trapezoidal base area.

According to a further embodiment of the foot, the at least two supporting elements comprise a base area in the form of an isosceles trapezoid.

A trapezoidal shape represents the simplest form of a supporting element described above. In this case, the first and second sides of the base area are connected by two further straight sides.

According to a further embodiment, the at least one joining element has a rectangular base area.

According to a further embodiment, the at least two supporting elements are rotatable or foldable against the at least one joining element about the respective first side of the respective supporting element, so that an angle between the extension plane of the respective supporting element and the at least one joining element is variable, in particular so that, when the angle is reduced in a specific angular range, a mechanical stress arises between the respective supporting element and the at least one joining element. This is possible, for example, if the respective supporting element and the at least one joining element are formed of a board, e.g. an HDF board, and are connected to each other by a mitre which is configured accordingly.

According to a further embodiment, the second sides of at least two supporting elements are mechanically connected to the second panel of the basic body. According to a further embodiment, the second sides of the at least two supporting elements are arranged in the direction of the pallet width, the second sides each comprising a length corresponding at most to the maximum extension, in particular substantially the maximum extension, of the at least one second opening of the second panel in the direction of the pallet width. In this arrangement it is advantageously possible to insert the at least one foot through the at least one second opening into the at least one cutout of the layer.

According to a further embodiment, the extension in the direction of the pallet depth of the at least one second opening is smaller than the extension in the direction of the pallet depth of the at least one cutout of the layer overlapping the at least one second opening. This creates spaces between the second panel and the tube segments surrounding the corresponding cutout or the inner surfaces of the wall of the tube segment forming the cutout, into which spaces, in particular, the supporting elements of a foot according to the invention can be introduced.

According to a further embodiment, the second sides of the at least two joining elements are arranged in the direction of the pallet depth, the second sides each comprising a length which corresponds at most to the extension, in particular substantially the extension, of the at least one second opening of the second panel in the direction of the pallet depth.

According to a further embodiment, the extension in the direction of the pallet width of the at least one second opening is smaller than the extension in the direction of the pallet width of the at least one cutout of the layer overlapping with the at least one second opening.

When, upon insertion of the at least one foot through the at least one first opening, the foot is configured such that the at least two supporting elements can be folded or rotated around the at least one joining element, and the at least one foot is introduced through the at least one second opening into the at least one cutout, the foot opens after the passage of the at least one second opening with enlargement of the said angle and the supporting elements shift in the direction of the pallet depth (in the case that the second sides of the supporting elements are arranged in the direction of the pallet width) or pallet width (in the case that the second sides of the supporting elements are arranged in the direction of the pallet depth).

If the extension of the at least one second opening in the direction of the pallet depth or pallet width is less than the extension of the corresponding at least one cutout which overlaps with the corresponding at least one second opening, the supporting elements each enter a corresponding space formed by the second panel and the tube segments surrounding the at least one cutout. In particular, when the at least one foot and the at least one cutout are correspondingly designed, in the state in which the supporting elements are inserted into the at least one cutout, there is a mechanical stress by which the supporting elements exert a force on the second panel and the adjacent tube segments, or the inner surfaces of the wall of the tube segment forming the cutout, which force advantageously favors a fixed mechanical connection of the at least one foot to the basic body.

Alternatively, the at least one first opening and the at least one second opening may also comprise the same extension in the direction of the pallet width. If the foot is dimensioned accordingly, sufficient mechanical anchoring of the foot is also provided in this case.

According to a further embodiment, the extension of the at least one first opening of the first panel in the direction of the pallet width is smaller than the extension of the corresponding at least one cutout with which the at least one first opening overlaps, wherein particularly the said extension of the at least one first opening is designed in such a way that the at least two supporting elements of the at least one foot bear against the boundary of the at least one first opening when the at least one foot is inserted into the corresponding at least one cutout.

According to a further embodiment, the extension of the at least one first opening of the first panel in the direction of the pallet depth is smaller than the extension of the corresponding at least one cutout with which the at least one first opening overlaps, wherein particularly the said extension of the at least one first opening is designed in such a way that the at least two supporting elements of the at least one foot bear against the boundary of the at least one first opening when the at least one foot is inserted into the corresponding at least one cutout.

The latter two embodiments have the advantage of allowing a more stable mechanical connection between the basic body and the at least one foot. Moreover, due to the mechanical connection with the first panel, the at least one foot cannot slip out of the at least one cutout through the first opening. This locking is achieved in particular by the at least two supporting elements widening from the first side to the second side.

Alternatively, the at least one first opening and the at least one second opening may also comprise the same extension in the direction of the pallet depth. If the foot is dimensioned accordingly, sufficient mechanical anchoring of the foot is also provided in this case.

According to a further embodiment, the pallet comprises at least one runner, particularly according to the third aspect of the invention, which is mechanically connected to the basic body.

According to a further embodiment, the runner comprises a wood composite or is formed of a wood composite.

According to a further embodiment, the runner comprises a bottom board arranged parallel to the first panel and at least one block mechanically connected to the bottom board.

According to a further embodiment, the block comprises a wood composite or is formed of a wood composite.

According to a further embodiment, the at least one block is at least partially arranged in the at least one cutout.

According to a further embodiment, the at least one block is mechanically connected to the basic body, in particular to the first panel.

On runners, it is advantageously possible to transport, in particular pull, push, roll or drive, the pallet according to the invention over the floor, conveyors and roller conveyors.

According to a further embodiment, the at least one block is mechanically connected to the second panel, in particular by means of a positive connection. In particular, the at least one block is mechanically connected to that side of the second panel which is adjacent to the respective cutout of the layer. Therein, in particular, the second panel comprises no second opening overlapping the at least one cutout. In this case, the second panel is closed at the position of the respective cutout. The second panel in this case delimits the respective cutout on one side.

According to a further embodiment, the second panel is completely closed. This means that the second panel in this embodiment has no openings.

According to a further embodiment, the at least one block lies at least partially positively against at least one tube segment, in particular a plurality of tube segments, of the layer.

By such an arrangement the block is advantageously stabilized by the tube segments of the layer against shear forces acting on the runner.

According to a further embodiment, the at least one block is completely surrounded by tube segments in the plane of the pallet width and pallet depth. Alternatively, the at least one block rests on the inner surfaces of the tube segment forming the cutout.

A second aspect of the invention relates to a foot, in particular for a basic body of a pallet according to the first aspect of the invention, wherein the foot comprises at least two supporting elements for mechanically connecting the foot to the basic body and at least one joining element, and wherein particularly the at least two supporting elements and the at least one joining element are formed of a board of a wood composite, e.g. an HDF board, and wherein the at least two supporting elements comprise a base area with a first side and a second side arranged parallel to the first side, the at least two supporting elements each being mechanically connected via their first side to the at least one joining element, and the length of the first side representing the minimum extension of the respective supporting element in the direction of the respective first side, and the length of the second side representing the maximum extension of the respective supporting element in the direction of the respective second side. Therein, in particular, the first side and the second side comprise different lengths.

A first sub-aspect of the second aspect of the invention relates to a foot for a pallet, in particular according to the first aspect of the invention, wherein the foot comprises at least two supporting elements, in particular for mechanically connecting the foot to a basic body of the pallet, and at least one joining element, wherein particularly the at least two supporting elements and the at least one joining element are formed from a board of a wood composite, wherein the at least two supporting elements comprise a base area with a first side and a second side arranged parallel to the first side, wherein the at least two supporting elements are each mechanically connected via their first side to the at least one joining element, and wherein the length of the first side represents the minimum extension of the respective supporting element in the direction of the respective first side, and wherein the length of the second side represents the maximum extension of the respective supporting element in the direction of the respective second side, wherein the foot is adapted, in particular for mechanically connecting the foot to the basic body, to be arranged at least partially in a cutout of the basic body, wherein particularly the second sides of the supporting elements are adapted to be mechanically connected to a second panel of the basic body.

The said mechanical connection of the foot with the basic body can take place, for example, by clamping or wedging the supporting elements in the respective cutout of the layer. Optionally, the supporting elements can also be glued with components of the pallet basic body.

According to an embodiment of the foot, the at least two supporting elements comprise a trapezoidal base area.

According to a further embodiment of the foot, the at least two supporting elements comprise a base area in the form of an isosceles trapezoid.

According to a further embodiment, the at least one joining element comprises a rectangular base area.

According to a further embodiment, the at least two supporting elements are rotatable or foldable against the at least one joining element about the respective first side of the respective supporting element, so that an angle between the plane of extension of the respective supporting element and that of the at least one joining element is variable, so that in particular a mechanical stress arises between the respective supporting element and the at least one joining element when the angle is reduced. This is the case, for example, if the respective supporting element and the at least one joining element are formed of a board and are connected to one another at an appropriately designed mitre.

A third aspect of the invention relates to a runner, in particular for a pallet according to the first aspect of the invention, wherein the runner comprises a bottom board and at least one block mechanically connected to the bottom board, and wherein the at least one block comprises a first cover plate, a second cover plate and a core layer arranged between the first cover plate and the second cover plate, wherein the core layer comprises at least a first partial layer and at least a second partial layer each formed from a plurality of tube segments arranged in parallel in a row, the tube segments each comprising a wall and two cut ends circumferentially delimiting the tube segments. In particular, the at least one block is mechanically connected to the bottom board of the runner by means of the first cover plate or the second cover plate. Such blocks can be inserted into cutouts in the basic body of a pallet according to the invention. In particular, the first cover plate or the second cover plate of a respective block is mechanically connected to the second panel of the basic body, in particular to the side of the second panel adjacent to the respective cutout.

According to an embodiment of the runner, the tube segments of the first partial layer are mechanically connected to the first cover plate by their cut ends and the tube segments of the second partial layer are mechanically connected to the second cover plate by their cut ends.

The blocks according to the invention show a high mechanical stability with low weight due to the used partial layers of tube segments.

A fourth aspect of the invention relates to a sandwich block, in particular for producing a layer of a pallet according to the first aspect of the invention, wherein the sandwich block comprises a block width, a block depth perpendicular to the block width and a block height perpendicular to the block width and the block depth, and wherein the sandwich block comprises at least one ply extending in the direction of the block width, in particular a plurality of plies extending in the direction of the block width and stacked in the direction of the block height, wherein the ply or plies each comprise a plurality of tube segments, wherein the tube segments each comprise two cut ends which delimit the tube segments in the circumferential direction, and wherein the tube segments comprise a segment depth in the longitudinal extension direction of the respective tube segment, a segment width along a connecting line between the cut ends perpendicular to the longitudinal extension direction and a segment height perpendicular to the segment depth and the segment width, and wherein the tube segments are arranged in the plies such that the segment depth of the tube segments extends in the direction of the block depth, the segment width of the tube segments extends along the block width, and the segment height of the tube segments extends along the block height, wherein the sandwich block comprises at least one through hole continuous in the direction of the block depth.

A first sub-aspect of the fourth aspect of the invention relates to a sandwich block, in particular for forming a layer of a pallet according to the first aspect of the invention, wherein the sandwich block comprises a block width, a block depth perpendicular to the block width and a block height perpendicular to the block width and the block depth, and wherein the sandwich block comprises at least one ply extending in the direction of the block width, in particular a plurality of plies extending in the direction of the block width and stacked in the direction of the block height, wherein the ply or plies each comprise a plurality of tube segments, wherein the tube segments each comprise two cut ends which delimit the tube segments in the circumferential direction, and wherein the tube segments comprise a segment depth in the longitudinal extension direction of the respective tube segment, a segment width along a connecting line between the cut ends perpendicular to the longitudinal extension direction and a segment height perpendicular to the segment depth and the segment width, and wherein the tube segments are arranged in the plies in such a manner that the segment depth of the tube segments extends in the direction of the block depth, the segment width of the tube segments extends along the block width, and the segment height of the tube segments extends along the block height, the sandwich block comprising at least one through hole which is continuous in the direction of the block depth and which, in the direction of the block height, comprises an extension which corresponds at least to the segment height of the tube segments and, in the direction of the block depth, comprises an extension which corresponds at least to the segment width of the tube segments.

A layer for a pallet according to an invention can be formed from such a sandwich block by separating the sandwich block, wherein the at least one cutout in the direction of the pallet width comprises an extension which corresponds at least to the segment width and in the direction of the pallet depth comprises an extension which corresponds at least to the segment height.

A second sub-aspect of the fourth aspect of the invention relates to a sandwich block, in particular for producing a layer of a pallet according to the first aspect of the invention, wherein the sandwich block has a block width, a block depth perpendicular to the block width and a block height perpendicular to the block width and the block depth, and wherein the sandwich block comprises at least one ply extending in the direction of the block width, in particular a plurality of plies extending in the direction of the block width and stacked in the direction of the block height, and wherein the ply or plies each comprise a plurality of tube segments, wherein the tube segments each comprise two cut ends which delimit the tube segments in the circumferential direction, and wherein the tube segments comprise a segment depth in the longitudinal extension direction of the respective tube segment, a segment width along a connecting line between the cut ends perpendicular to the longitudinal extension direction and a segment height perpendicular to the segment depth and the segment width, and wherein the tube segments are arranged in the plies in such a manner that the segment depth of the tube segments extends in the direction of the block depth, the segment width of the tube segments extends along the block width, and the segment height of the tube segments extends along the block height, the sandwich block comprising at least one through hole continuous in the direction of the block depth and which, in the direction of the block height, comprises an extension which is smaller than the segment height of the tube segments and, in the direction of the block depth, an extension which is smaller than the segment width of the tube segments.

A layer for a pallet according to an invention can be formed from such a sandwich block by separating the sandwich block, wherein the at least one cutout in the direction of the pallet width comprises an extension which is smaller than the segment width and in the direction of the pallet depth comprises an extension which is smaller than the segment height.

The terms 'tube segment', 'segment depth', 'segment width' and 'segment height' are defined in the description of the first aspect of the invention and are used interchangeably here.

In the context of this invention, the term "through hole" may refer to the cavity formed by the interior of the tube segments. As described above, the extension of this cavity is smaller than the segment width by twice the wall thickness and smaller than the segment height by one wall thickness. Thus, the corresponding cavity is smaller than the through hole in both directions. Alternatively, a through hole in the sense of the invention can also be formed by omitting tube segments at certain positions of certain plies of the sandwich block. Therein, the through hole can be formed by a gap between two adjacent tube segments. By separating sandwich block according to the invention in the direction of the block width perpendicular to the longitudinal extension direction of the tube segments, a large number of layers for the pallet according to the invention can be produced advantageously in a simple way. At the position of the at least one through hole, cutouts are formed in the layer. By omitting tube segments, layers with cutouts of various arrangements can be formed in this way.

According to a further embodiment, the extension of the through hole in the direction of the block height is at least 50 mm, wherein the extension of the through hole in the direction of the block width is at least 30 mm.

After creating the layer of the pallet by cutting the sandwich block, such dimensioned through holes result in sufficiently dimensioned cutouts into which feet can be inserted.

According to a further embodiment, all tube segments of the plies essentially comprise a uniform segment depth.

According to a further embodiment, all tube segments of the plies essentially comprise a uniform segment width.

According to a further embodiment, all tube segments of the plies essentially comprise a uniform segment height.

According to an embodiment of the sandwich block, the plies are mechanically connected to each other.

According to an embodiment of the sandwich block, the through hole comprises an extension in the direction of the block height which corresponds to at least twice the segment height of the tube segments.

According to an embodiment of the sandwich block, the through hole comprises an extension in the direction of the block width that corresponds to at least twice the segment width of the tube segments.

According to a further embodiment, the sandwich block comprises at least one first ply, at least one second ply and at least one intermediate plate, wherein the at least one first ply and the at least one second ply each extend in the direction of the block width and the block depth and each comprise a plurality of tube segments, wherein the tube segments of the at least one first ply and the tube segments of the at least one second ply are mechanically connected via the at least one intermediate plate, wherein particularly the tube segments of the at least one first ply are mechanically connected by their cut ends to a first plate side of the at least one intermediate plate, and wherein the tube segments of the at least one second ply are mechanically connected by their cut ends to a second plate side of the at least one intermediate plate opposite the first plate side.

By inserting at least one intermediate plate between two adjacent plies of the sandwich block, layers with strips can be easily formed by separating the sandwich block in the direction of the block width perpendicular to the longitudinal extension direction of the tube segments, with strips mechanically connecting two adjacent rows of tube segments, the strips being produced by separating the at least one intermediate plate. This makes it easy to create a particularly stable layer for a pallet according to the invention.

A fifth aspect of the invention relates to a method for manufacturing a pallet, in particular according to the first aspect of the invention, the method comprising at least the following steps:

providing a sandwich block according to the fourth aspect of the invention, forming a layer by separating the sandwich block in the direction of the block width perpendicular to the longitudinal extension direction of the tube segments, wherein at least one cutout of the layer is formed by a portion of the at least one through hole, arranging the layer on a first panel, and mechanically connecting the layer to the first panel, arranging a second panel on the layer on a side opposite the first panel parallel to the first panel and mechanically connecting the second panel to the layer, wherein the basic body is formed, wherein particularly the second panel comprises at least one second opening, and wherein the second panel is arranged on the layer in such a way that the at least one second opening at least partially overlaps with the at least one cutout.

By means of the method described, a plurality of layers for a pallet according to the invention can be easily produced. The cutouts do not have to be formed after the layers have been produced, but are already formed by the through holes of the cut sandwich block. The method according to the invention thus enables the production of layers for pallets at lower manufacturing costs and shorter production times.

According to an embodiment of the method, the first panel on which the layer is placed comprises at least one first opening and the layer is placed on the first panel in such a way that the at least one cutout in the layer at least partially overlaps with the at least one first opening.

Alternatively, according to a further embodiment, after mechanically connecting the layer to the first panel, at least one first opening is produced in the first panel.

According to a further embodiment, after mechanically connecting the second panel to the layer, at least one second opening is produced in the second panel.

This has the advantage that the dimensioning of the openings of the first and/or second panel can be adapted to different arrangements of the cutouts of the core layer.

According to an embodiment of the method, at least one foot, in particular according to the second aspect of the invention, or at least one block of a runner, in particular according to the third aspect of the invention, is introduced into the at least one cutout, which overlaps with the at least one first opening, through the at least one opening of the first panel, wherein particularly the at least one foot or at least one block is mechanically connected to the basic body. Therein, in particular, the at least one foot or the at least one block is mechanically connected to the second panel of the basic body.

According to a further embodiment of the method, at least one foot, in particular according to the second aspect of the invention, is introduced through the at least one second opening of the second panel into the at least one cutout which overlaps with the at least one second opening, wherein particularly the at least one foot is mechanically connected to the basic body.

According to a further embodiment of the method, at least one foot, in particular according to the second aspect of the invention, or at least one block of a runner, in particular according to the third aspect of the invention, is mechanically connected to the basic body of the pallet, in particular to the first panel.

A sixth aspect of the invention relates to a further method for manufacturing a pallet, in particular according to the first aspect of the invention, the method comprising at least the following steps:

providing a sandwich block, wherein the sandwich block comprises a block width, a block depth perpendicular to the block width and a block height perpendicular to the block width and the block depth, and wherein the sandwich block comprises a plurality of plies extending in the direction of the block width and stacked in the direction of the block height, the plies each comprising a plurality of tube segments, the tube segments each comprising two cut ends delimiting the tube segments in the circumferential direction, and wherein the tube segments comprise a segment depth in the longitudinal extension direction of the respective tube segment, a segment width along a connecting line between the cut ends perpendicular to the longitudinal extension direction and a segment height perpendicular to the segment depth and the segment width, and wherein the tube segments are arranged in the plies such that the segment depth of the tube segments extends in the direction of the block depth, the segment width extends along the block width, and the segment height of the tube segments extends in the direction of the block height, forming a layer by separating the sandwich block in the direction of the block width perpendicular to the longitudinal extension direction of the tube segments, producing at least one cutout in the layer which is continuous in the direction of the pallet height, arranging the layer on a first panel, and mechanically connecting the layer to the first panel, arranging a second panel on the layer on a side opposite to the first panel parallel to the first panel and mechanically connecting the second panel to the layer, thereby forming the basic body. Such a method has the advantage that the cutouts in this case are not formed by omitting tube segments in the layer or in the sandwich block, such that the dimensions of the cutouts (e.g. for special productions of smaller quantities) are freely selectable.

A first sub-aspect of the sixth aspect relates to a method for manufacturing a pallet, in particular according to the first aspect of the invention, the method comprising at least the following steps:

providing a sandwich block, the sandwich block comprising a block width, a block depth perpendicular to the block width and a block height perpendicular to the block width and the block depth, and wherein the sandwich block comprises a plurality of plies extending in the direction of the block width and stacked in the direction of the block height, the plies each comprising a plurality of tube segments, the tube segments each comprising two cut ends delimiting the tube segments in the circumferential direction, and wherein the tube segments comprise a segment depth in the longitudinal extension direction of the respective tube segment, a segment width along a connecting line between the cut ends perpendicular to the longitudinal extension direction and a segment height perpendicular to the segment depth and the segment width, and wherein the tube segments are arranged in the plies such that the segment depth of the tube segments extends in the direction of the block depth, the segment width extends along the block width, and the segment height of the tube segments extends in the direction of the block height, forming a layer by separating the sandwich block in the direction of the block width perpendicular to the longitudinal extension direction of the tube segments, producing at least one cutout in the layer which is continuous in the direction of the pallet height, wherein the at least one cutout comprises, in the direction of the pallet width, an extension which corresponds at least to the segment width, and comprises, in the direction of the pallet depth, an extension which corresponds at least to the segment height, arranging the layer on a first panel, and mechanically connecting the layer to the first panel, arranging a second panel on the layer on a side opposite to the first panel parallel to the first panel and mechanically connecting the second panel to the layer, thereby forming the basic body.

A second sub-aspect of the sixth aspect relates to a method for manufacturing a pallet, in particular according to the first aspect of the invention, the method comprising at least the following steps:

providing a sandwich block, the sandwich block comprising a block width, a block depth perpendicular to the block width and a block height perpendicular to the block width and the block depth, and wherein the sandwich block comprises a plurality of plies extending in the direction of the block width and stacked in the direction of the block height, the layers each comprising a plurality of tube segments, the tube segments each comprising two cut ends which delimit the tube segments in the circumferential direction, and wherein the tube segments comprise a segment depth in the longitudinal extension direction of the respective tube segment, a segment width along a connecting line between the cut ends perpendicular to the longitudinal extension direction and a segment height perpendicular to the segment depth and the segment width, and wherein the tube segments are arranged in the plies such that the segment depth of the tube segments extends in the direction of the block depth, the segment width extends along the block width, and the segment height of the tube segments extends in the direction of the block height, forming a layer by separating the sandwich block in the direction of the block width perpendicular to the longitudinal extension direction of the tube segments, producing at least one cutout in the layer which is continuous in the direction of the pallet height, wherein the at least one cutout comprises an extension in the direction of the pallet width which is smaller than the segment width and comprises an extension in the direction of the pallet depth which is smaller than the segment height, arranging the layer on a first panel, and mechanically connecting the layer to the first panel, arranging a second panel on the layer on a side opposite to the first panel parallel to the first panel and mechanically connecting the second panel to the layer, thereby forming the basic body. Therein, the at least one cutout can be formed for example by sawing or milling.

In the method described, a sandwich block can also be used which does not comprise a through hole continuous in the direction of the block depth, which in the direction of the block height comprises an extension which corresponds at least to the segment height of the tube segments and in the direction of the block width comprises an extension which corresponds at least to the segment width of the tube segments. In this case the sandwich block is not formed according to the invention.

According to an embodiment of the method, the at least one cutout is formed before the layer is arranged on the first panel.

According to a further embodiment of the method, the at least one cutout is formed after the layer has been arranged on the first panel, wherein particularly at least one first opening of the first panel is produced in one step with the at least one cutout of the layer, so that the at least one cutout and the at least one first opening overlap at least partially.

According to a further embodiment of the method, the at least one cutout is produced after arranging the second panel on the layer, wherein particularly at least one second opening of the second panel is produced in one step with the at least one cutout of the layer, so that the at least one cutout and the at least one second opening at least partially overlap.

Therein, the at least one cutout and the at least one first opening or second opening, respectively, are jointly sawn out or milled out, for example.

Further details and advantages of the invention are explained by the following description of embodiments on the basis of figures. These show:

Figure 1:
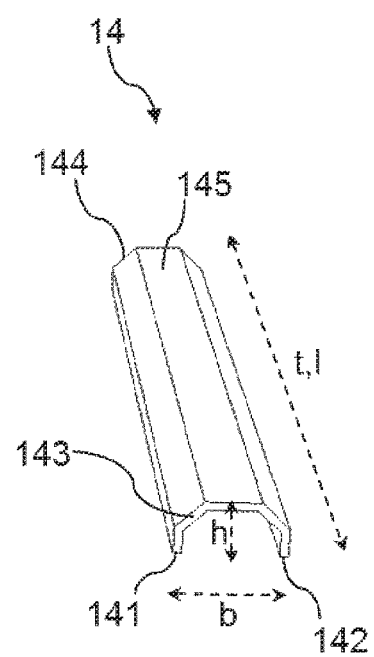
FIG. 1 shows a schematic representation of a tube segment.

FIG. 1 shows in detail a tube segment 14, which extends along a longitudinal extension direction I and comprises a wall 145 as well as two cut ends 141, 142 delimiting the wall 145 in the circumferential direction of the tube segment 14. In addition, the tube segment 14 comprises two cut surfaces 143, 144, which delimit the tube segment 14 in the longitudinal extension direction I.

The tube segment 14 comprises a segment depth t in the direction of the longitudinal extension direction I, a segment width b corresponding to the maximum extension in the direction of a connecting line between the cut ends 141, 142, and a segment height h corresponding to the maximum extension in the third spatial direction perpendicular to the segment width b and the segment depth t.

In the embodiment shown here, the tube segment 14 comprises an octagon segment shaped cross-section transversely to the longitudinal extension direction I. The tube segment 14 is composed of five strips running along the longitudinal extension direction I, which each have an angle of 45° to the adjacent strip or strips.

As an alternative to the embodiment shown in FIG. 1, the tube segment 14 may also comprise a differently shaped cross-section, in particular a circular-segment-shaped cross-section, e.g. semicircular, trapezoidal-segment-shaped or U-shaped cross-section.

Figure 2:
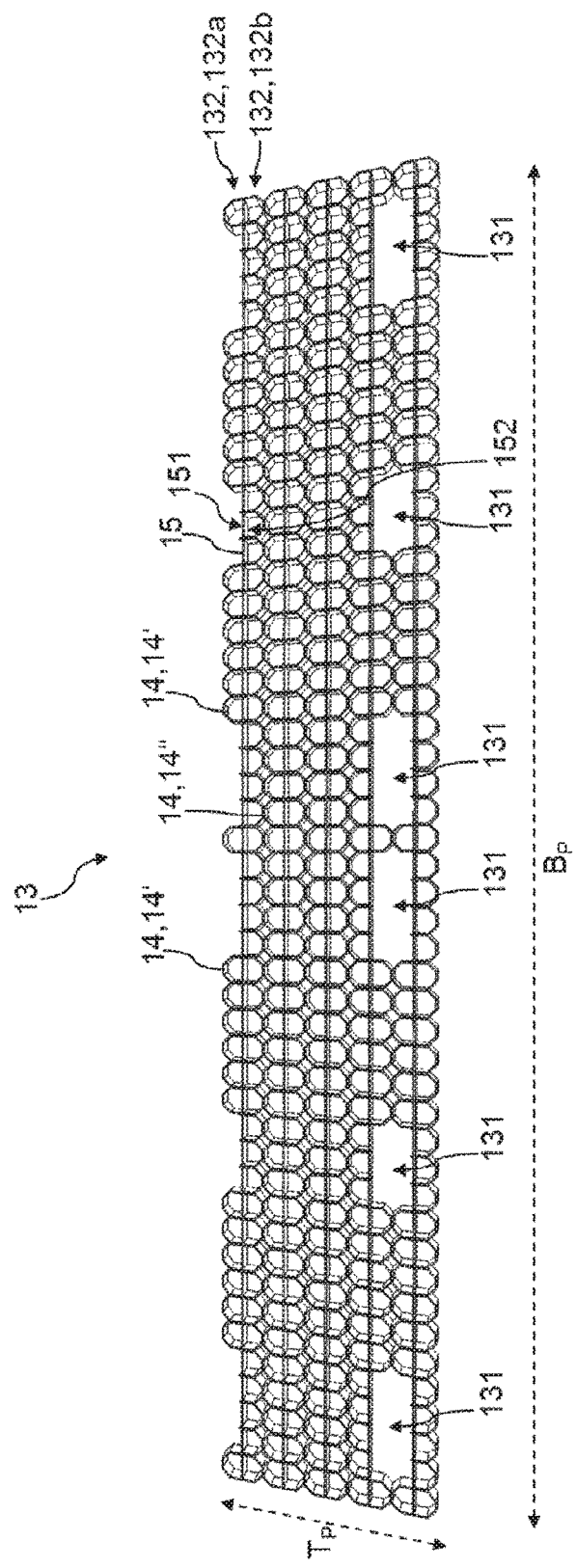
FIG. 2 is a schematic representation of a layer of a pallet according to the invention.

FIG. 2 shows a layer 13 of a pallet 1 according to the invention composed of tube segments 14 and strips 15. Tube segments 14 are arranged in a plurality of rows 132 in the direction of pallet width $B_P$, rows 132 being stacked in the direction of pallet depth $T_P$. The tube segments 14 are positioned in such a way that the segment widths b run in the direction of the pallet width $B_P$ and the segment heights h run in the direction of the pallet depth $T_P$. The segment depths t run in the third spatial direction not shown. The designations for segment width b, segment height h and segment depth t are to be taken from the illustration of the tube segment 14 in FIG. 1.

In each case a first row 132a and a second row 132b are mechanically connected to a corresponding strip 15, wherein the cut ends 141,142 (see FIG. 1) of the tube segments 14' of the first row 132a are mechanically connected to a first strip side 151 of the strip 15, and wherein the tube segments 14" of the second row 132b are mechanically connected to a second strip side 152 of the strip 15 opposite the first strip side 151. Therein, the tube segments 14' of the first row 132a are rotated 180° about an axis which runs along the longitudinal extension direction I with respect to the tube segments 14" of the second row 132b. The tube segments 14" of the second row 132b are mechanically connected to the tube segments 14 of an adjacent row 132, whereby the walls 145 (see FIG. 1) of the tube segments 14" of the second row 132b are connected to the walls 145 of the tube segments 14 of the adjacent row 132.

Layer 13 comprises a plurality of cutouts 131, each formed by omitting tube segments 14. The cutouts 131 shown here are formed by omitting three or four tube segments 14 in the direction of pallet width $B_P$ and two tube segments 14 in the direction of pallet depth $T_P$. Accordingly, the cutouts 131 each have an extension of three or four segment widths b in the direction of the pallet width $B_P$ and an extension of two segment heights h in the direction of the pallet depth $T_P$.

Figure 3:
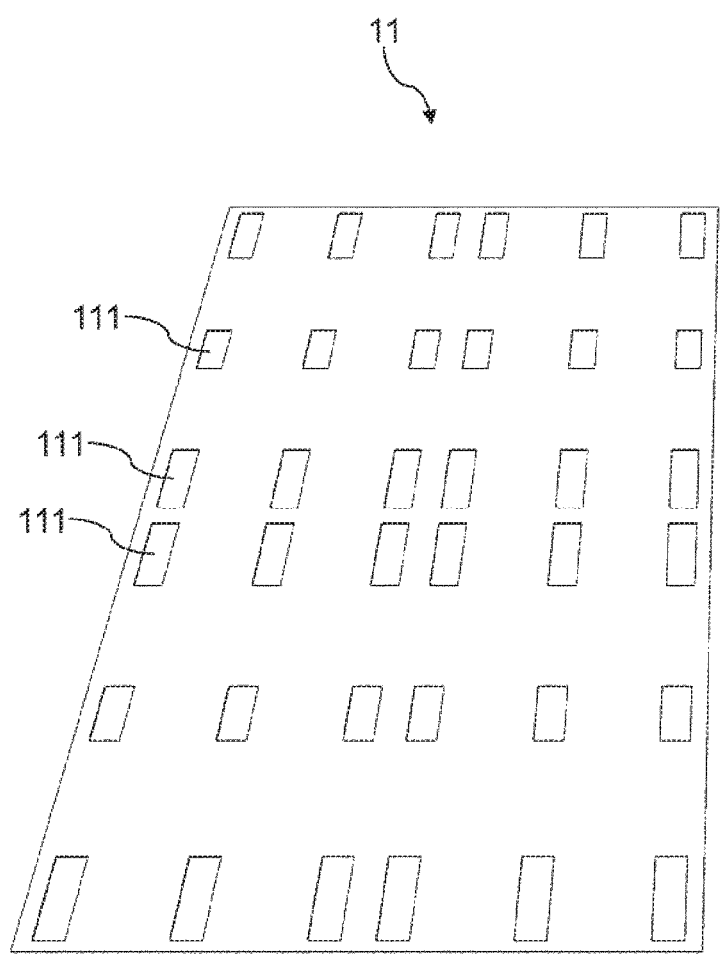
FIG. 3 is a schematic representation of a first panel of a pallet according to the invention.

FIG. 3 shows a first panel 11 for a pallet 1 according to the invention. The first panel 11 comprises a plurality of first openings 111 arranged in such a way that they can be at least partially aligned with the cutouts 131 of a layer 13 of pallet 1. In the case of pallet 1 embodiments where the second panel has 12 second openings 121, the second panel 12 may be formed in the same way as the first panel 11 shown here.

Figure 4:
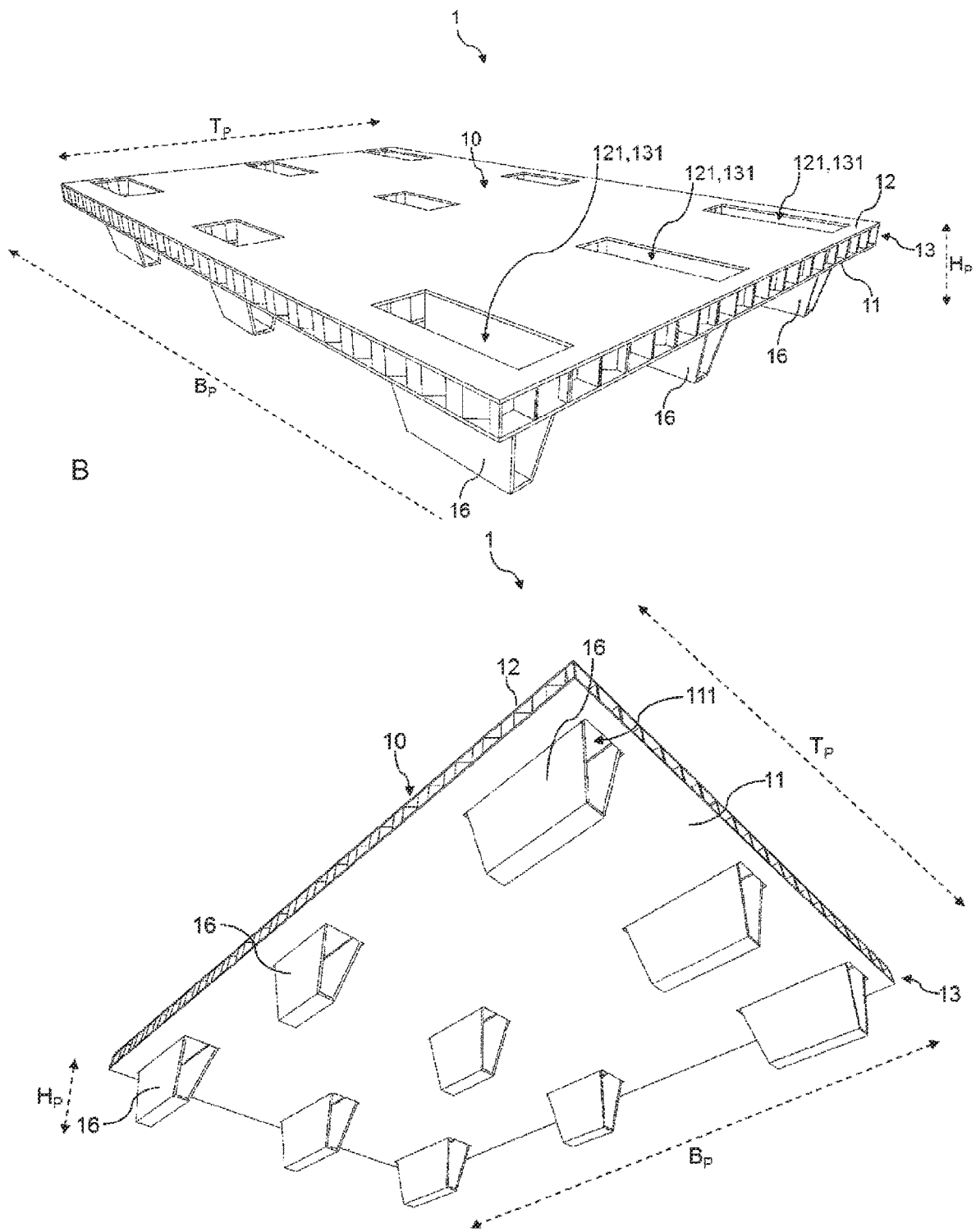
FIG. 4 are schematic representations of a pallet according to the invention with feet.
Figure 7:
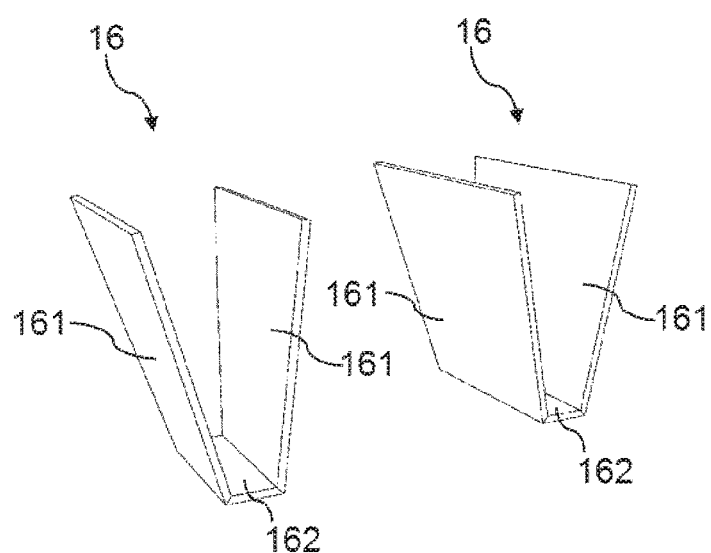
FIG. 7 is a schematic representation of feet according to invention.
Figure 7:
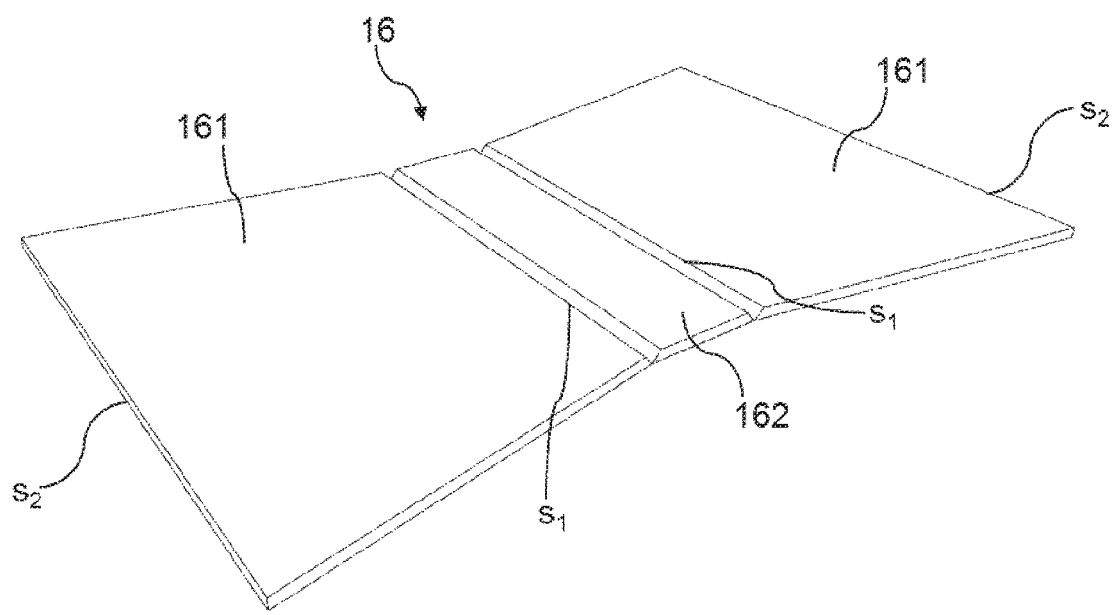

FIG. 4A shows a pallet 1 according to the invention in an embodiment with feet 16 in a perspective view from the top of pallet 1. Pallet 1 comprises a layer 13 arranged between a first panel 11 and a second panel 12. Layer 13 is structured in the same way as layer 13 shown in FIG. 2. The segment depths t of the tube segments 14 of layer 13 run in the direction of a pallet height $H_P$. Furthermore, cutouts 131 of layer 13 are shown, which overlap with second openings 121 of the second panel 12. Therein, the second openings 121 are narrower in the direction of pallet depth $T_P$ than the corresponding cutouts 131 in the direction of pallet depth $T_P$. As a result, the supporting elements 161 of the feet 16 (see FIG. 7) are arranged in corresponding gaps between the second panel 12 and the tube segments 14 adjacent to the corresponding cutout 131. When stacking several pallets 1 according to the invention, for example, the feet 16 of another pallet 1 can be inserted into the cutouts 131, which are open at the top, which allows space-saving stacking.

FIG. 4B shows a perspective view of the underside of pallet 1 shown in FIG. 4A. This view shows the first openings 111 of the first panel 11 in which the feet 16 are inserted.

Figure 5:
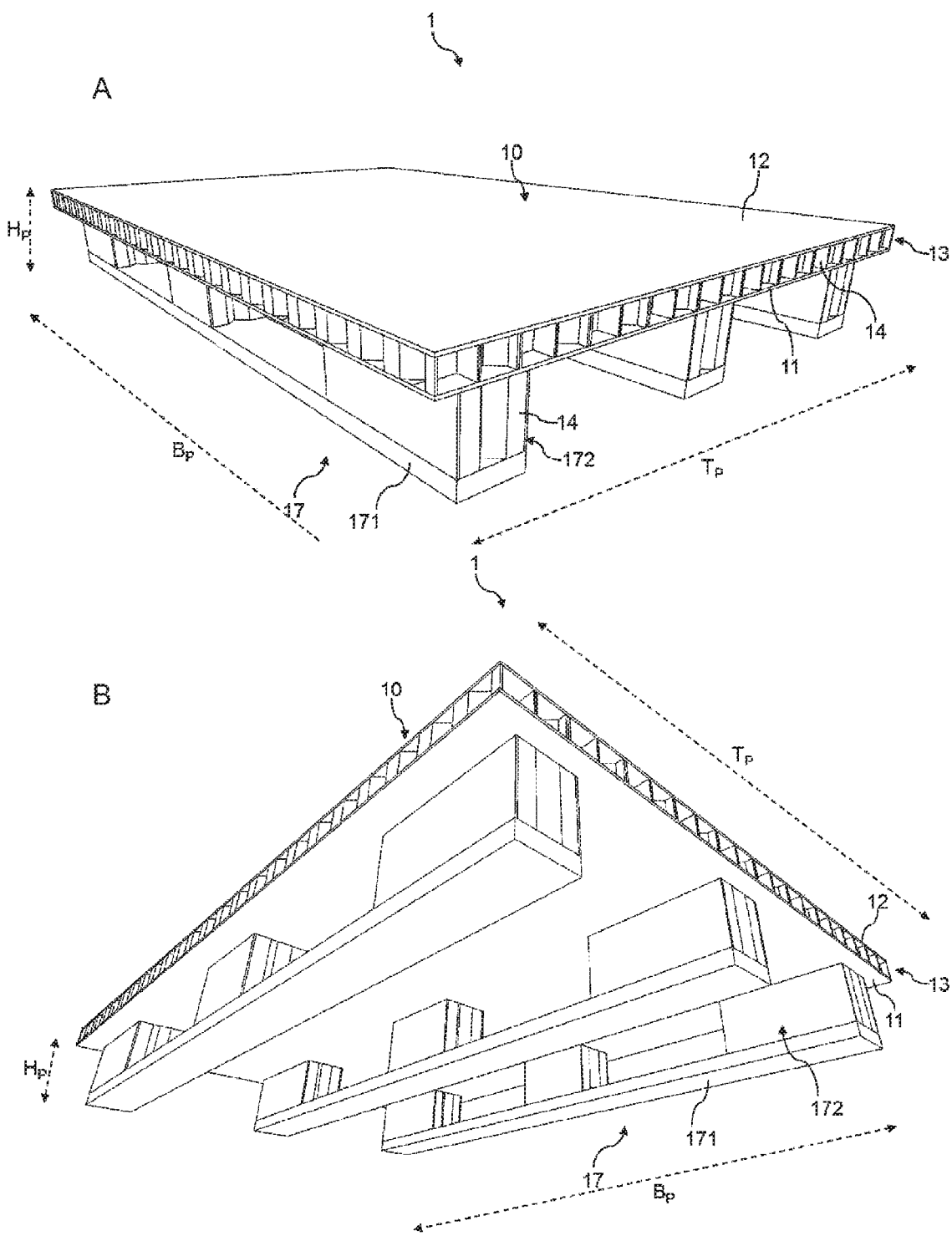
FIG. 5 are schematic representations of a pallet according to the invention with runners.

FIGS. 5A and 5B show a pallet 1 according to the invention in an embodiment with runners 17 in a perspective view, whereas FIG. 5A shows a view from the top and FIG. 5B shows a view from the bottom of pallet 1. Layer 13 is structured in the same way as layer 13 shown in FIG. 2.

The runners 17 each comprise a bottom board 171 mechanically connected to three blocks 172. The blocks 172 are inserted into the (hidden) first openings 111 of the first panel 11, which are not shown here.

Figure 6:
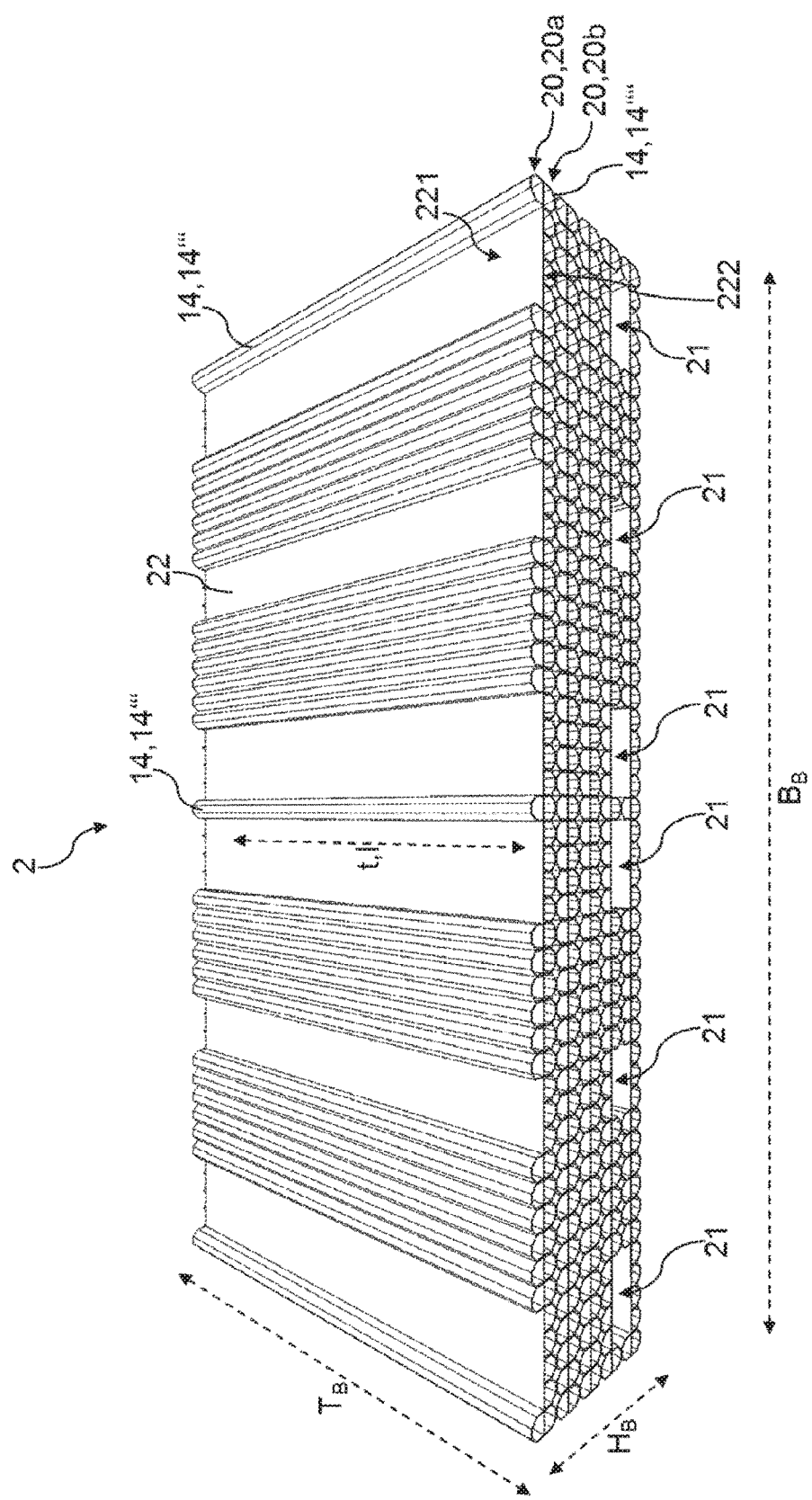
FIG. 6 is a schematic representation of a sandwich block according to the invention.

FIG. 6 shows a sandwich block 2 with a block width $B_B$, a block depth $T_B$ and a block height $H_B$.

The sandwich block 2 comprises a plurality of plies 20 of tube segments 14, the plies being stacked on top of each other in the direction of the block height $H_B$. The tube segments 14 are positioned in such a way that the longitudinal extension direction I of the tube segments 14 or the segment depth t runs in the direction of the block depth $T_B$ and the segment width b runs in the direction of the block width $B_B$.

In each case a first ply 20a and a second ply 20b are mechanically connected to a corresponding intermediate plate 22, wherein the cut ends 141,142 (see FIG. 1) of the tube segments 14''' of the first ply 20a are mechanically connected to a first plate side 221 of the intermediate plate 22, and wherein the tube segments 14'''' of the second ply 20b are mechanically connected to a second plate side 222 of the intermediate plate 22 opposite the first plate side 221. Therein, the tube segments 14''' of the first ply 20a are rotated 180° about an axis running along the longitudinal extension direction I with respect to the tube segments 14'''' of the second ply 20b. The tube segments 14'''' of the second ply 20b are mechanically connected to the tube segments 14 of an adjacent ply 20, whereby the walls 145 (see FIG. 1) of the tube segments 14'''' of the second ply 20b are connected to the walls 145 of the tube segments 14 of the adjacent ply 20.

Sandwich block 2 comprises a plurality of through holes 21 continuous in the direction of the pallet depth $T_P$, each formed by omitting tube segments 14. The through holes 21 shown here are formed by omitting three or four tube segments 14 in a ply 20, with the tube segments 14 omitted at respective positions of two adjacent superimposed plies 20. This results in through holes 21 with an extension of three or four segment widths b in the direction of the block width $B_B$ and two segment heights h in the direction of the block height $H_B$.

By separating the sandwich block 2 shown here transversely to the longitudinal extension direction I of the tube segments 14, i.e. in a plane running between the block width $B_B$ and the block height $H_B$, a layer 13 can be created for a pallet 1 according to the invention. Such a layer 13 is shown in FIG. 2. In particular, a slice is cut off from sandwich block 2, where layer 13 is formed by the slice. When cutting, new cut surfaces 143,144 (see FIG. 1) of the tube segments 14 are formed. The pallet width $B_P$ of a pallet 1 formed by means of the layer 13 created corresponds to the block width $B_B$, the pallet depth $T_P$ corresponds to the block height $H_B$ and the pallet height $H_P$ is freely selectable during cutting and is defined in particular by the thickness of a disc cut off from the sandwich block 2.

FIG. 7A shows two perspective views of a foot 16 for a pallet 1 according to the invention in a folded form. The foot 16 comprises two supporting elements 161 and a joining element 162, which mechanically connects the supporting elements 161. FIG. 7B shows foot 16 in an unfolded form. In the embodiment shown here, the foot 16 is formed of strips of a wood composite, whereby the supporting elements 161 and the joining element 162 can be formed of a single strip, which has mitres sawn or milled between the supporting elements 161 and the joining element 162, as shown in FIG. 7B. The supporting elements 161 in the embodiment shown here are trapezoidal and have two parallel sides $s_1, s_2$, the first side $s_1$ being shorter than the second side $s_2$. The first sides $s_1$ are mechanically connected to the joining element 162.

If the foot 16 is folded or rotated as shown in FIG. 7A, a preload of the foot 16 can be generated by applying a force, so that in particular the foot 16 can be inserted into the cutout 131 under the preload through the at least one second opening 121 of the second panel 12. When the preload is released, the foot 16 opens at least partially so that the supporting elements 161 form a positive connection with the inside of the second panel 12 or with the tube segments 14 of the layer 13.

Figure 8:
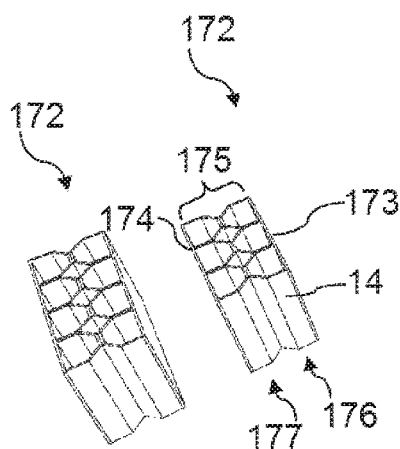
FIG. 8 are schematic representations of blocks of a runner according to the invention.
Figure 8:
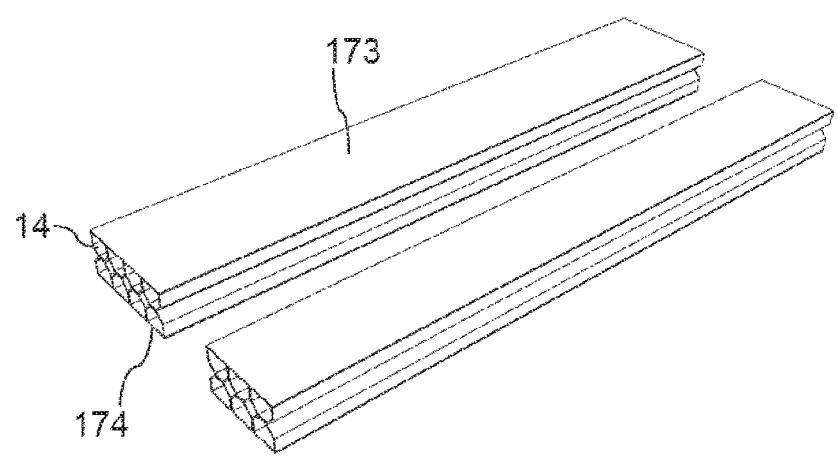

FIG. 8A shows two versions of a block 172 according to the invention for a runner 17 of a pallet 1 according to the invention and FIG. 8B shows an intermediate product from which several blocks 172 can be produced by cutting.

The blocks comprise a first cover plate 173, a second cover plate 174 and a core layer 175 arranged between the cover plates 173, 174, which comprises a first partial layer 176 and a second partial layer 177 of tube segments 14. The tube segments 14 of the first sublayer 176 are mechanically connected to the first cover plate 173 by their cut ends 141, 142 (see FIG. 1) and the tube segments 14 of the second sublayer 177 are mechanically connected to the second cover plate 174 by their cut ends 141, 142. The first and the second sub-layer 176, 177 are mechanically connected via the walls 145 (see FIG. 1) of the tube segments 14. The embodiments shown comprise three or four parallel tube segments 14 per sublayer 176,177.

LIST OF REFERENCE NUMERALS

| | |
|---|---|
| 1 | Pallet |
| 10 | Basic body |
| 11 | First panel |
| 111 | First opening |
| 12 | Second panel |
| 121 | Second opening |
| 13 | Layer |
| 131 | Cutout |
| 132 | Row |
| 132a | First row |
| 132b | Second row |
| 14, 14', 14'', 14''', 14'''' | Tube segment |
| 141, 142 | Cut ends |
| 143, 144 | Cut surface |
| 145 | Wall |
| 15 | Strip |
| 151 | First strip side |
| 152 | Second strip side |
| 16 | Foot |
| 161 | Supporting element |
| 162 | Joining element |
| 17 | Runner |
| 171 | Bottom board |
| 172 | Block |
| 173 | First cover plate |
| 174 | Second cover plate |
| 175 | Core layer |
| 176 | First partial layer |
| 177 | Second partial layer |
| 2 | Sandwich block |
| 20 | Ply |
| 20a | First ply |
| 20b | Second ply |
| 21 | Through hole |
| 22 | Intermediate plate |
| 221 | First plate side |
| 222 | Second plate side |
| l | Longitudinal direction |
| b | Segment breadth |
| t | Segment depth |
| h | Segment height |
| $B_P$ | Pallet breadth |
| $T_P$ | Pallet depth |
| $H_P$ | Pallet height |
| $B_B$ | Block breadth |
| $T_B$ | Block depth |
| $H_B$ | Block height |
| $S_1$ | First side |
| $S_2$ | Second side |

The invention claimed is:

1. A pallet (1) comprising a basic body (10) comprising at least the following components:
   a first panel (11) and a second panel (12) arranged parallel to the first panel (11), wherein the first panel (1) and the second panel (12) each extend in the direction of a pallet width (BP) and a pallet depth (TP), wherein the pallet (1) comprises a pallet height (HP) perpendicular to the pallet width (BP) and the pallet depth (TP),
   a layer (13) arranged between the first panel (11) and the second panel (12), the layer (13) comprising a plurality of tube segments (14), wherein the tube segments (14) each comprise two cut ends (141, 142) which delimit the tube segments (14) in the circumferential direction, and wherein the tube segments (14) each comprise a segment depth (t), a segment width (b) and a segment height (h), the segment depth (t) corresponding to the maximum extension of the tube segment (14) in the longitudinal extension direction (I), the segment width (b) corresponding to the maximum extension of the tube segment (14) along a connecting line between the cut ends (141, 142) perpendicularly to the longitudinal extension direction (I), and the segment height (h) corresponding to the maximum extension perpendicular to the segment depth (t) and the segment width (b), and wherein the tube segments (14) are arranged in the layer (13) such that
   the segment depth (t) runs in the direction of the pallet height (HP),
   the segment width (b) runs in the direction of the pallet width (BP), and
   the segment height (h) runs in the direction of the pallet depth (TP), characterized in that
the layer (13) comprises at least one cutout (131) which is continuous in the direction of the pallet height (HP), wherein the first panel (11) comprises at least one first opening (111) which at least partially overlaps with the at least one cutout (131),
the layer (13) comprises at least one row (132) of tube segments (14) running in the direction of the pallet width (BP),
wherein the layer (13) comprises at least one first row (132a) of tube segments (14') running in the direction of the pallet width (BP), at least one second row (132b) of tube segments (14") running in the direction of the pallet width (BP), and at least one strip (15), wherein the tube segments (14') of the at least one first row (132a) and the tube segments (14") of the at least one second row (132b) are mechanically connected via the at least one strip (15),
and wherein the tube segments (14) comprise a wood composite or are formed of a wood composite.

2. The pallet (1) according to claim 1, characterized in that the at least one cutout (131) comprises an extension in the direction of the pallet width (BP) which corresponds at least to the segment width (b) and comprises an extension in the direction of the pallet depth (TP) which corresponds at least to the segment height (h).

3. The pallet (1) according to claim 1, characterized in that the at least one cutout (131) comprises an extension in the direction of the pallet width (BP) which is less than the segment width (b) and comprises an extension in the direction of the pallet depth (TP) which is less than the segment height (h).

4. The pallet (1) according to claim 1, characterized in that an extension of the cutout (131) in the direction of the pallet width (BP) is at least 50 mm, wherein an extension in the direction of the pallet depth (TP) is at least 30 mm.

5. The pallet (1) according to claim 1, characterized in that the at least one cutout (131) is completely surrounded by tube segments (14) in the direction of the pallet width (BP) and the pallet depth (TP).

6. The pallet (1) according to claim 1, characterized in that the second panel (12) comprises at least one second opening (121) which at least partially overlaps with the at least one cutout (131), wherein the at least one second opening (121) in the direction of the pallet depth (TP) or in the direction of the pallet width (BP) has a smaller extension than the at least one first cutout (131) with which the at least one second opening (121) overlaps.

7. The pallet (1) according to claim 1, characterized in that the pallet (1) further comprises at least one foot (16) mechanically connected to the basic body (10), wherein the at least one foot (16) is at least partially arranged in the at least one cutout (131) to mechanically connect the foot (16) to the basic body (10).

8. The pallet (1) according to claim 7, characterized in that the at least one foot (16) each comprises at least two supporting elements (161) for mechanically connecting the at least one foot (16) to the basic body (10) and at least one joining element (162)), the at least two supporting elements (161) being each mechanically connected on a first side (s1) by means of the at least one joining element (162).

9. The pallet (1) according to claim 8, characterized in that the at least two supporting elements (161) comprise a base area with a first side (s1) and a second side (s2) arranged parallel to the first side (s1), wherein the at least two supporting elements (161) each are connected to the at least one joining element (162) via their first side (s1), wherein the length of the first side (s1) represents the minimum extension of the respective supporting element (161) in the direction of the respective first side (s1), and wherein the length of the second side (s2) represents the maximum extension of the respective supporting element (161) in the direction of the respective second side (s2).

10. The pallet (1) according to claim 8, characterized in that the at least two supporting elements (161) are foldable against the at least one joining element (162) around the respective first side of the respective supporting element, so that an angle between the plane of extension of the respective supporting element (161) and the at least one joining element (162) is variable.

11. A foot (16) for a pallet (1) according to claim 1, the foot (16) comprising at least two supporting elements (161) for mechanically connecting the foot (16) to a basic body (10) of the pallet (1) and at least one joining element (162), wherein the at least two supporting elements (161) and the at least one joining element (162) are formed from a board of a wood composite, the at least two supporting elements (161) comprising a base area with a first side (s1) and a second side (s2) arranged parallel to the first side (s1), the at least two supporting elements (161) each being mechanically connected via their first side (s1) to the at least one joining element (162), and wherein the length of the first side (s1) represents the minimum extension of the respective supporting element (161) in the direction of the respective first side (s1), and wherein the length of the second side (s2) represents the maximum extension of the respective supporting element (161) in the direction of the respective second side (s2), characterized in that the foot (16) is configured to be at least partially arranged in the cutout (131) of the basic body (10) of the pallet (1) to mechanically connect the foot (16) to the basic body (10).

12. The foot according to claim 11, characterized in that the at least two supporting elements (161) are foldable against the at least one joining element (162) around the respective first side (s1) of the respective supporting element (161), so that an angle formed between the plane of extension of the respective supporting element (161) and the at least one joining element (162) is variable.

13. A pallet (1) comprising a basic body (10) comprising at least the following components:
   a first panel (11) and a second panel (12) arranged parallel to the first panel (11), wherein the first panel (1) and the second panel (12) each extend in the direction of a pallet width (BP) and a pallet depth (TP), wherein the pallet (1) comprises a pallet height (HP) perpendicular to the pallet width (BP) and the pallet depth (TP),
   a layer (13) arranged between the first panel (11) and the second panel (12), the layer (13) comprising a plurality of tube segments (14), wherein the tube segments (14) each comprise two cut ends (141, 142) which delimit the tube segments (14) in the circumferential direction, and wherein the tube segments (14) each comprise a segment depth (t), a segment width (b) and a segment height (h), the segment depth (t) corresponding to the maximum extension of the tube segment (14) in the longitudinal extension direction (I), the segment width (b) corresponding to the maximum extension of the tube segment (14) along a connecting line between the cut ends (141, 142) perpendicularly to the longitudinal extension direction (I), and the segment height (h) corresponding to the maximum extension perpendicular to the segment depth (t) and the segment width (b), and wherein the tube segments (14) are arranged in the layer (13) such that
- the segment depth (t) runs in the direction of the pallet height (HP),
- the segment width (b) runs in the direction of the pallet width (BP), and
- the segment height (h) runs in the direction of the pallet depth (TP), characterized in that the layer (13) comprises at least one cutout (131) which is continuous in the direction of the pallet height (HP), wherein the first panel (11) comprises at least one first opening (111) which at least partially overlaps with the at least one cutout (131), and wherein the tube segments (14) comprise a wood composite or are formed of a wood composite, and wherein the pallet (1) further comprises at least one runner (17) mechanically connected to the basic body (10), the runner (17) comprising a bottom board (171) arranged parallel to the first panel (11) and at least one block (172) mechanically connected to the bottom board (171), wherein the at least one block (172) is arranged at least partially in the at least one cutout (131).

14. The pallet (1) according to claim 13, characterized in that the at least one block (172) comprises a first cover plate (173), a second cover plate (174) and a core layer (175) arranged between the first cover plate (173) and the second cover plate (174), wherein the core layer (175) comprises at least one first partial layer (176) and at least one second partial layer (177), which are each formed from a plurality of tube segments (14) arranged parallel in a row, the tube segments (14) each comprising a wall (145) and two cut ends (141,142) which delimit the tube segments (14) in the circumferential direction.

15. A runner (17) comprising a bottom board (171) and at least one block (172) mechanically connected to the bottom board (171), characterized in that the at least one block (172) comprises a first cover plate (173), a second cover plate (174) and a core layer (175) arranged between the first cover plate (173) and the second cover plate (174), wherein the core layer (175) comprises at least one first partial layer (176) and at least one second partial layer (177), which are each formed from a plurality of tube segments (14) arranged parallel in a row, the tube segments (14) each comprising a wall (145) and two cut ends (141,142) which delimit the tube segments (14) in the circumferential direction.

16. A sandwich block (2) comprising a block width (BB), a block depth (TB) extending perpendicularly to the block width (BB) and a block height (HB) extending perpendicularly to the block width (BB) and the block depth (TB), and wherein the sandwich block (2) comprises at least one ply (20) extending in the direction of the block width (BB), the plies (20) each comprising a plurality of tube segments (14), the tube segments (14) each comprising two cut ends (141, 142) which delimit the tube segments (14) in the circumferential direction, and wherein the tube segments (14) comprise
- a segment depth (t) in the longitudinal extension direction (I) of the respective tube segment (14),
- a segment width (b) along a connecting line between the cut ends (141,142) perpendicular to the longitudinal extension direction (I) and
- a segment height (h) perpendicular to the segment depth (t) and the segment width (b), and wherein the tube segments (14) are arranged in the plies (20) such that the segment depth (t) of the tube segments (14) extends in the direction of the block depth (TB) and the segment width (b) extends along the block width (BB), characterized in that the sandwich block (2) comprises at least one through hole (21) which is continuous in the direction of the block depth (TB).

17. The sandwich block (2) according to claim 16, characterized in that the at least one through hole (21) comprises an extension in the direction of the block height (HB) which corresponds at least to the segment height (h) of the tube segments (14) and an extension in the direction of the block width (BB) which corresponds at least to the segment width (b) of the tube segments (14).

18. The sandwich block (2) according to claim 16, characterized in that the at least one through hole (21) comprises an extension in the direction of the block height (HB) which is smaller than the segment height (h) of the tube segments (14) and an extension in the direction of the block width (BB) which is smaller than the segment width (b) of the tube segments (14).

19. The sandwich block (2) according to claim 16, characterized in that the extension of the through hole (21) in the direction of the block height (HB) is at least 50 mm, wherein the extension of the through hole (21) in the direction of the block width (BB) is at least 30 mm.

20. The sandwich block (2) according to claim 16, characterized in that the sandwich block (2) comprises at least one first ply (20a), at least one second ply (20b) and at least one intermediate plate (22), the at least one first ply (20a) and the at least one second ply (20b) each being oriented in the direction of the block width (BB) and the block depth (TB) and each comprising a plurality of tube segments (14''', 14''''), wherein the tube segments (14''') of the at least one first ply (20a) and the tube segments (14'''') of the at least one second ply (20b) are mechanically connected via the at least one intermediate plate (22).

21. A method of manufacturing a pallet (1), comprising at least the following steps:
- providing a sandwich block (2) according to claim 16,
- forming a layer (13) by separating the sandwich block (2) in the direction of the block width (BB) perpendicular to the longitudinal extension direction (I) of the tube segments (14), wherein at least one cutout (131) of the layer (13) is formed by a portion of the at least one through hole (21),
- arranging the layer (13) on a first panel (11), which comprises at least a first opening (111), so that the at least one cutout (131) of the layer (13) at least partially overlaps with the at least one first opening (111), and mechanically connecting the layer (13) to the first panel (11),
- arranging a second panel (12) on the layer (13) on a side opposite the first panel (11) parallel to the first panel (11) and mechanically connecting the second panel (12) to the layer (13), wherein the basic body (10) is formed.

22. The method according to claim 21, wherein at least one foot (16) or at least one block (172) of a runner (17) is introduced through the at least one first opening (111) of the first panel (11) into the at least one cutout (131) which overlaps with the at least one first opening (111.

23. The method according to claim 21, wherein at least one foot (16) is introduced through the at least one second opening (121) of the second panel (12) into the at least one cutout (131) which overlaps with the at least one second opening (121).

\* \* \* \* \*